Aug. 7, 1951 W. J. BRENDEL ET AL 2,563,390
CARBONATING APPARATUS
Filed March 17, 1948
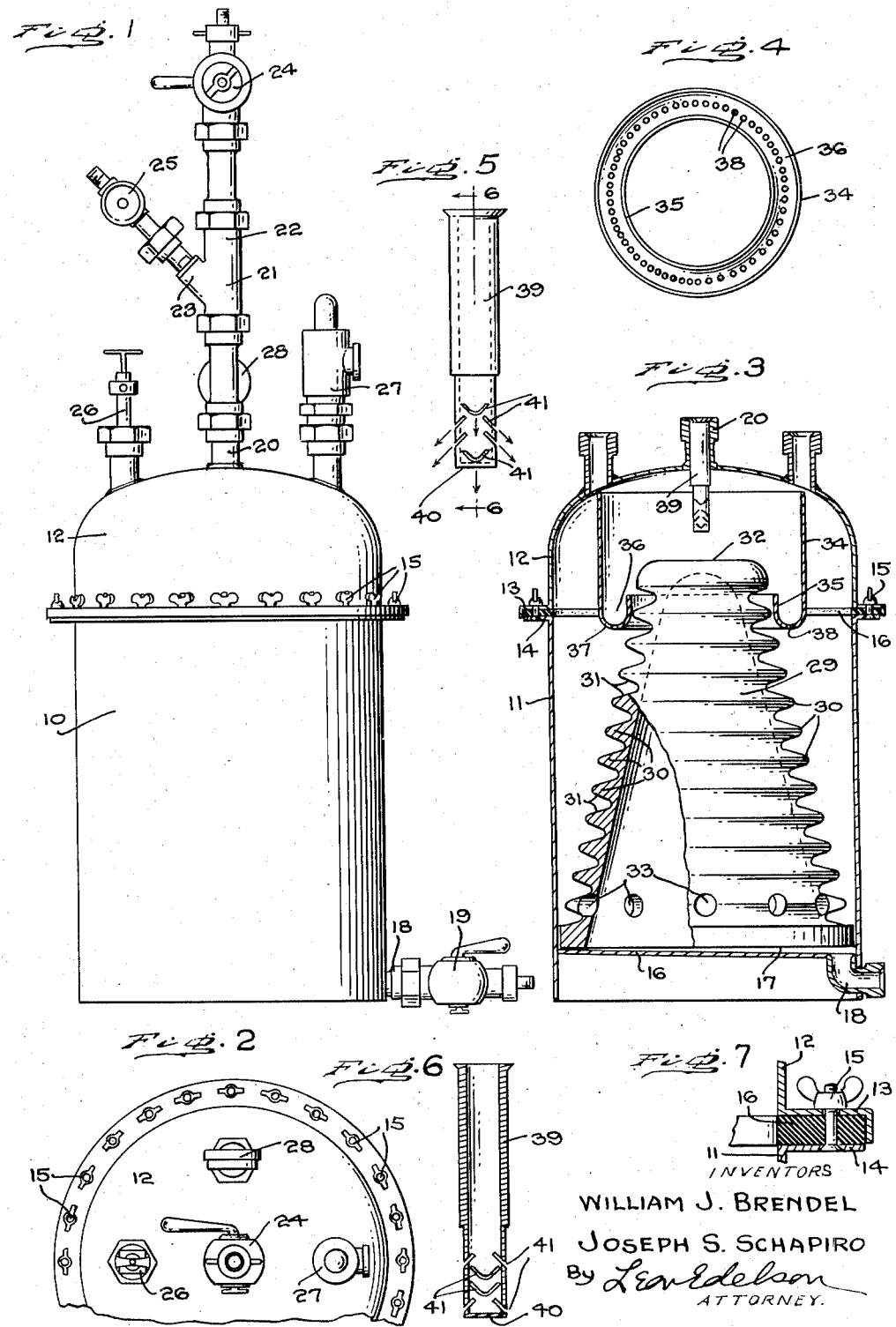
INVENTORS
WILLIAM J. BRENDEL
JOSEPH S. SCHAPIRO
By Leo Edelson
ATTORNEY.

Patented Aug. 7, 1951

2,563,390

UNITED STATES PATENT OFFICE 2,563,390

CARBONATING APPARATUS

William J. Brendel, Ellicott City, Md., and Joseph S. Schapiro, Los Angeles, Calif., assignors to Sparkle Beverages, Inc., Ellicott City, Md., a corporation of Maryland Application March 17, 1948, Serial No. 15,354

3 Claims. (Cl. 261—112)

1

This invention relates to the art of producing carbonated beverages and more particularly to apparatus especially designed for the production of carbonated milk beverages.

While heretofore and prior to the present invention various attempts have been made to produce carbonated milk, as by incorporating carbon dioxide gas into the milk while agitating the milk in a closed vessel either by the use of internal agitators or by rocking or shaking more or less violently the vessel in which the milk is contained, none of them have been entirely satisfactory from the standpoint of the quality of the milk beverage so produced, this for the reason that violent agitation of the milk during the process of absorbing the carbon dioxide gas adversely affects the wholesomeness, palatability and marketable value of the final product.

In addition to the foregoing, a serious problem in the production of carbonated milk beverages has been to provide a carbonating apparatus which is adequately designed to facilitate cleansing and sterilization of all working parts thereof which are contacted by the milk. The Federal and State laws governing sterilization of apparatus employed in the production of milk products are exceedingly rigid and consequently the milk carbonating apparatus must necessarily be of a construction enabling it to be readily dismantled so that all parts thereof may be effectively cleaned and sterilized.

It is accordingly among the objects of the present invention to provide an apparatus for carbonating milk which is simple and efficient in operation; which insures maximum absorption by the milk of the carbonating gas in uniform amounts requisite to produce a wholesome and palatable carbonated milk beverage, all without subjecting the milk to agitation; and which is adapted to be completely dismantled so that the several component parts thereof may be thoroughly cleaned and sterilized after each period of operation of the apparatus.

Other objects and advantages of the present invention will appear more fully hereinafter, it being understood that said invention consists substantially in the combination, construction, location and general arrangement of parts, all as described in detail in the following specification, as shown in the accompanying drawings and as finally pointed out in the appended claims.

In the accompanying drawings, which are illustrative of a preferred construction embodying the principles of the present invention:

Figure 1 is an elevational view of the carbonating apparatus;

2

Figure 2 is a top plan view thereof;

Figure 3 is a vertical sectional view thereof;

Figure 4 is a top plan view of the internal milk-receiving distributor;

Figure 5 is an elevational view of the milk-injecting nozzle;

Figure 6 is a sectional view of the nozzle as taken along the line 6—6 of Figure 5; and Figure 7 is a sectional view of a detail of construction.

Referring now more particularly to the drawings, it will be observed that the apparatus of the present invention includes a closed metal container 10 designed and equipped to operate as a pressure chamber in which the milk and carbonating gas are to be mixed. The container 10 is formed of two main separable parts, namely, a cylindrical body member 11 and a dome-shaped top member 12, these members being respectively provided with complementally formed annular flanges 13 and 14 adapted to be detachably bolted together by a plurality of bolts 15. A suitable gasket 16 disposed between the flanges 13 and 14 forms an hermetic seal therebetween. The body member 11 is provided with a bottom wall 16 the central portion of which is dished or otherwise depressed, as at 17, to direct the carbonated milk toward a discharge outlet 18 suitably fitted in the bottom wall of the container at a low point immediately adjacent the cylindrical wall thereof. Preferably, this fitting projects laterally through the wall of the container, as shown in Figure 3, a suitable valve 19 being secured to its freely projecting end for controlling the discharge of the carbonated liquid from the container.

The dome-shaped top member 12 is centrally provided with an inlet fitting 20 to which is detachably secured a standard type of dairy fitting 21 having divergent branches 22 and 23 for respective connection with conduits leading to suitable sources of supply of the milk to be carbonated and of the carbon dioxide gas for carbonating the milk. A suitable control valve 24 is included in the milk supply conduit connected to the milk inlet branch 22, while a separate control valve 25 is included in the gas supply line connected to the gas inlet branch 23. Preferably, the top member 12 of the container is additionally provided with a standard air release valve 26 and with a standard pressure relief valve 27. A standard pressure guage 28 is desirably connected into the tank dome for ascertaining the pressure prevailing in the container 10 during the process of carbonating the milk.

Adapted for removable disposition interiorly of the container 10, as shown in Figure 3, is a conical member 29 of hollow construction, this member being preferably cast or otherwise formed of aluminum. The conical external surface of the member 29 is corrugated so as to provide it with a series of vertically spaced annular elements 30 of successively increasing diameter downwardly from the upper end of the cone, each such element being formed with oppositely inclined upper and lower surfaces 31. The upper end of the conical member 29 is closed, as at 32, while formed in the lower end thereof are a series of circumferentially spaced openings 33 through which the carbonated milk is delivered to the bottom wall 16 of the container for final discharge therefrom by way of the discharge outlet 18.

Removably fitted upon the reduced upper end of the conical member 29 is a cup-shaped distributor 34 the lower end of which is inturned, as at 35, to provide an annular upwardly presenting channel 36 for receiving the mixture of milk and carbonated gas which is injected into the container 10 by way of the inlet fitting 20. The bottom wall 37 of said channel 36 is provided with a plurality of circumferentially spaced apertures 38, these apertures being uniformly spaced and of a number sufficient to insure uniform distribution of the milk circumferentially about the cone 29 at a level just below the perforated bottom of the distributor 32.

In order to insure proper injection of the milk and gas mixture into the distributor 32 the inlet fitting 20 is provided with a removable injector nozzle 39 in the form of a tube having a closed bottom end 40 and a series of narrow slots 41 each cut at an angle into the cylindrical wall of the nozzle tube. Preferably, these slots 41 form angles of approximately 45 degrees each with respect to the vertical axis of the nozzle so as to effect discharge of the milk and gas mixture into the distributor cup 34 in the form of a plurality of relatively wide attenuated streams which impinge the internal cylindrical surface of the distributor cup at a level just above the annular channel 36. The relative spacing of the nozzle slots 41 is such that the milk and gas mixture is injected into the distributor cup in the form of a flared hollow stream having a minimum tendency to become turbulent or to swirl about its axis of discharge.

In operation of the apparatus, the milk to be carbonated is pumped under suitable pressure into the container simultaneously as the carbonating gas is injected into the container. Inasmuch as the milk and gas are initially introduced to each other in the inlet fitting 20, the milk discharged from the nozzle 39 into the distributor cup 34 is preliminarily charged with a certain amount of the gas. However, the amount of gas so initially absorbed by the milk is insufficient to cause any frothing thereof, in consequence of which, following its injection into the distributor cup 34, the milk is gently discharged therefrom by way of the apertures 33 upon the corrugated external surface of the conical member 29. The milk so discharged upon said external corrugated surface of the cone continues to flow downwardly over the inclined surfaces 31 thereof in the form of a thin film, the gravity flow of this film being more or less uniform over the entire surface of the cone due to the control afforded by the gradually increasing diameter of the flow surface.

It will be apparent, of course, that the interior of the container 10 is filled with carbon dioxide gas under the pressure thereof as supplied to the container and that during the course of its gravity flow downwardly over the corrugated surface of the cone 29 the thin film of milk uniformly absorbs the gas in large amount, the gas absorptive capacity of the milk being very measurably increased by reason of the fact that the thin film of milk provides such increase in surface area as renders it capable of entraining the carbonating gas in a maximum amount. As the milk courses downwardly over the corrugated surface of the cone 29 it continues to absorb the carbonating gas so that when the milk reaches the bottom of the cone and is ready to be discharged from the container by way of its discharge outlet 18 it is fully and completely charged with carbonating gas.

It is, of course, apparent that the apparatus of the present invention is designed to be operated continuously for as long a period as may be desired, the period of the production run depending upon the supply of milk available for carbonation. In any case, the milk and gas is continuously injected into the apparatus for continuous discharge therefrom in the form of carbonated milk ready to be bottled or otherwise dispensed, the flow of the milk through the apparatus being at such rate as not to build up any appreciable volume of carbonated milk within the container 10. If desired, suitable controls (not shown) actuated by the level of the liquid in the container 10 may be employed to interrupt injection of the milk and gas into the container from their respective sources of supply automatically should the level of the carbonated milk rise above the openings 33 in the base portion of the cone 29, thereby insuring that said cone provides a maximum area of flow surface for the milk to be carbonated.

It will be understood, of course, that while the apparatus of the present invention is especially adapted for use in the production of carbonated milk beverages, it is equally well adapted for carbonating other beverage liquids, such as fruit juices, bottling syrups, water and the like.

It will be understood further that the apparatus as herein shown and described is susceptible of various changes and modifications which may be made from time to time without involving any departure from the general principles or real spirit of the present invention, and it is accordingly intended to claim the same broadly, as well as specifically, as indicated in the appended claims.

What is claimed as new and useful is:

1. In an apparatus for producing a carbonated beverage, a sealable vessel adapted to receive therein a carbonating gas at superatmospheric pressure, means for introducing into the gas-charged interior of said vessel a liquid to be carbonated by the gas, a cone disposed interiorly of and in coaxial relation with respect to said vessel, said cone rising from the bottom of said vessel to a point adjacent the top thereof and being disposed with its apex in axial registry with said liquid introducing means, and means for distributing the liquid uniformly about the apex of said cone for gravity flow downwardly along the conical surface thereof in the form of a circumferentially continuous relatively thin film, said liquid distributing means being in the form of an annulus removably fitted over the top of the cone, said annulus being provided with an annular liquid-receiving channel the base wall of which is perforated for discharge of the liquid onto the cone at points closely spaced circumferentially about the apex of the cone.

2. In an apparatus for producing a carbonated beverage, a sealable vessel adapted to receive therein a carbonating gas at superatmospheric pressure, means for introducing into the gas-charged interior of said vessel a liquid to be carbonated by the gas, a cone disposed interiorly of and in coaxial relation with respect to said vessel, said cone rising from the bottom of said vessel to a point adjacent the top thereof and being disposed with its apex in axial registry with said liquid introducing means, means for distributing the liquid uniformly about the apex of said cone for gravity flow downwardly along the conical surface thereof in the form of a circumferentially continuous relatively thin film, said cone being characterized in that it is of hollow construction and is provided adjacent its base with openings extending through the wall thereof to facilitate discharge of the carbonated liquid from the vessel and in that the external surface thereof is provided with a plurality of axially spaced annular elements, each of said elements having surfaces inclined to facilitate gravity flow of the liquid downwardly over the external surface of the cone, and liquid-dispensing means extending outwardly of said vessel and having communication with the interior of said cone below the region of said openings.

3. In an apparatus for producing a carbonated beverage, a sealable vessel adapted to receive therein a carbonating gas at superatmospheric pressure, nozzle means for introducing into the gas-charged interior of the vessel a liquid to be carbonated by the gas, a cone disposed interiorly of said vessel and having a corrugated external surface, said cone rising from the bottom of said vessel to a point closely adjacent the top thereof and being disposed with its apex in axial registry with said nozzle, and means provided at the apex end of said cone for distributing the liquid to be carbonated uniformly about the peripheral surface of the cone whereby the liquid is spread over the external surface of the cone for gravity flow downwardly thereof in the form of a relatively thin film having a substantial surface area exposed to contact by the gas, said last-mentioned distributing means including a perforated annular channel into which the liquid is directed by said nozzle means and from which the liquid is discharged to the liquid flow surface of said cone.

WILLIAM J. BRENDEL.
JOSEPH S. SCHAPIRO.

REFERENCES CITED

The following references are of record in the file of this patent:

UNITED STATES PATENTS

| Number | Name | Date |
| --- | --- | --- |
| 1,043,127 | Mueller | Nov. 5, 1912 |
| 1,455,930 | Nobis | May 22, 1923 |
| 2,212,275 | Mojonnier | Aug. 20, 1940 |
| 2,337,783 | Thompson et al. | Dec. 28, 1943 |
| 2,356,530 | Pflock | Aug. 22, 1944 |